United States Patent
Born

(10) Patent No.: US 10,647,063 B2
(45) Date of Patent: May 12, 2020

(54) METHOD AND SEALING DEVICE FOR SEALING THE EDGES OF COMPOSITE FIBER COMPONENTS

(71) Applicant: Airbus Operations GmbH, Hamburg (DE)

(72) Inventor: Johannes Born, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 614 days.

(21) Appl. No.: 14/802,598

(22) Filed: Jul. 17, 2015

(65) Prior Publication Data

US 2016/0016356 A1 Jan. 21, 2016

(30) Foreign Application Priority Data

Jul. 18, 2014 (DE) .................... 10 2014 214 031

(51) Int. Cl.
*B32B 37/00* (2006.01)
*B29C 65/08* (2006.01)
(Continued)

(52) U.S. Cl.
CPC .......... *B29C 65/08* (2013.01); *B29C 63/0026* (2013.01); *B29C 65/7802* (2013.01); *B29C 66/112* (2013.01); *B29C 66/114* (2013.01); *B29C 66/472* (2013.01); *B29C 66/712* (2013.01); *B29C 66/721* (2013.01); *B29C 66/7392* (2013.01); *B29C 66/836* (2013.01); *B29C 65/085* (2013.01); *B29C 66/71* (2013.01); *B29C 66/7212* (2013.01); *B29C 66/7394* (2013.01); *B29C 66/73921* (2013.01);
(Continued)

(58) Field of Classification Search
CPC . B29C 63/0026; B29C 65/08; B29C 65/7802; B29C 66/1122; B29C 66/43; B29C 66/81433; B29C 66/8161; B29C 66/8242; B29C 66/8322; B29C 66/8742; B29C 66/9221; B29C 66/9241; B29C 9/00
USPC ....................................... 156/73.1
See application file for complete search history.

(56) References Cited

U.S. PATENT DOCUMENTS

| 567,948 A | 9/1896 | Bracher |
| 4,333,791 A * | 6/1982 | Onishi .................. B29C 65/087 |
| | | 156/580.1 |

(Continued)

FOREIGN PATENT DOCUMENTS

| DE | 25 23 215 A1 | 12/1976 |
| DE | 44 45 842 A | 7/1996 |

(Continued)

OTHER PUBLICATIONS

German Office Action for Application No. 10 2014 214 031.5 dated Apr. 21, 2015.

(Continued)

*Primary Examiner* — James D Sells
(74) *Attorney, Agent, or Firm* — Jenkins, Wilson, Taylor & Hunt, P.A.

(57) ABSTRACT

A method for sealing the edges of composite fiber components includes applying a thermoplastic semifinished product to a cut edge of a composite fiber component and thermoplastically or integrally joining the thermoplastic semifinished product to the cut edge of the composite fiber component by ultrasonic welding.

5 Claims, 1 Drawing Sheet

(51) Int. Cl.
    *B29C 65/00*     (2006.01)
    *B29C 63/00*     (2006.01)
    *B29C 65/78*     (2006.01)
    *B29L 31/30*     (2006.01)
    *B29K 307/04*     (2006.01)
    *B29K 701/12*     (2006.01)

(52) U.S. Cl.
    CPC ...... *B29C 66/8122* (2013.01); *B29C 66/8341* (2013.01); *B29K 2307/04* (2013.01); *B29K 2701/12* (2013.01); *B29L 2031/3055* (2013.01); *B29L 2031/3076* (2013.01); *B29L 2031/3097* (2013.01)

(56) References Cited

U.S. PATENT DOCUMENTS

| | | | |
|---|---|---|---|
| 5,538,395 | A | 7/1996 | Hager |
| 6,193,830 | B1 | 2/2001 | Unrath |
| 7,896,994 | B2 | 3/2011 | Soccard |
| 8,597,446 | B2 | 12/2013 | Torriani et al. |
| 8,895,112 | B2 | 11/2014 | Doehle et al. |
| 8,905,291 | B2 * | 12/2014 | Schroth ............... B23K 20/103 156/580.1 |
| 9,205,627 | B2 | 12/2015 | Torriani et al. |
| 2003/0116253 | A1 * | 6/2003 | Mullet ................... E06B 9/266 156/73.1 |
| 2003/0145933 | A1 | 8/2003 | Torriani et al. |
| 2006/0073311 | A1 | 4/2006 | Hogg |
| 2007/0158012 | A1 | 7/2007 | Heil et al. |
| 2008/0128430 | A1 * | 6/2008 | Kovach .................. B32B 27/00 220/586 |
| 2013/0263999 | A1 | 10/2013 | Weiland et al. |
| 2014/0057067 | A1 | 2/2014 | Torriani et al. |
| 2014/0286697 | A1 | 9/2014 | Takeuchi et al. |

FOREIGN PATENT DOCUMENTS

| | | |
|---|---|---|
| DE | 199 55 575 A1 | 5/2001 |
| DE | 10 2007 021 651 A1 | 11/2008 |
| DE | 10 2009 060 692 A1 | 6/2011 |
| EP | 1 910 061 B1 | 12/2013 |
| EP | 2 977 186 B1 | 6/2018 |
| JP | 2002-200680 A | 7/2002 |
| JP | 2004-209916 A | 7/2004 |
| WO | WO 2005/075177 A1 | 8/2005 |
| WO | WO 2010/048735 A1 | 5/2010 |
| WO | WO 2013/084963 A1 | 6/2013 |

OTHER PUBLICATIONS

Extended European Search Report for European Application No. 15175641.8 dated Jan. 7, 2016.

Franck, "Kunststoff-Kompendium," Vogel Buchverlag, p. 467 (2000).

Notice of Opposition to European Application No. 15175641.8 dated Mar. 18, 2019.

* cited by examiner

METHOD AND SEALING DEVICE FOR SEALING THE EDGES OF COMPOSITE FIBER COMPONENTS

CROSS-REFERENCE TO RELATED APPLICATION

This application claims priority to DE 10 2014 214 031.5 filed Jul. 18, 2014, the entire disclosure of which is incorporated by reference herein.

TECHNICAL FIELD

The present disclosure relates to a method and to a sealing device for sealing the edges of composite fiber components, in particular carbon fiber-reinforced plastics components (CFRP), for use in the aerospace industry.

BACKGROUND

When producing carbon fiber-reinforced plastics components, components of this type are generally cut accordingly after being consolidated, formed or set. The carbon fibers are then exposed towards the outside at the cut edges of these components. In order to prevent corrosion, moisture penetration and fraying at the cut edges, the cut edges must be sealed towards the outside.

For example, in thermoplastic stamp forming methods, components are produced from plate-shaped carbon fiber-reinforced semifinished products. Regions of surplus material are usually cut off from the blank by a milling process, in order to produce a predetermined contour of the CFRP component. The milled component edges produced in this way can, for example, be sealed by a synthetic resin coating or single-component or dual-component synthetic resin systems. Manually applying such synthetic resins is, however, labour-intensive, time-consuming and expensive.

U.S. Pat. No. 567,948 A discloses, for example, a method for sealing the edges of cut, fibrous woven fabric components. DE 44 45 842 A1 discloses a method for producing filter inserts made of a nonwoven which is thermoplastically bondable. DE 10 2009 060 692 A1 discloses a method for sealing the edges of a fiber-reinforced component, wherein at least portions of an edge of the component are electrostatically coated with a thermoplastic powder, and the powder coating is melted and cured in a furnace in order to create a smooth edge seal.

SUMMARY

However, there is a need for simple and low-cost solutions for sealing the ends of cut edges of composite fiber components which can be implemented with high component throughput.

According to a first aspect, the disclosure herein therefore provides a method for sealing the edges of composite fiber components, comprising applying a thermoplastic semifinished product to a cut edge of a composite fiber component, and thermoplastically or integrally joining the thermoplastic semifinished product to the cut edge of the composite fiber component by ultrasonic welding.

According to a second aspect, the disclosure herein furthermore provides a sealing device for sealing the edges of composite fiber components, comprising a strip feeder designed to apply a thermoplastic semifinished product to a cut edge of a composite fiber component, and an ultrasonic welding apparatus designed to thermoplastically or integrally join the thermoplastic semifinished product to the cut edge of the composite fiber component by ultrasonic welding.

Advantages of the aspects according to the disclosure herein include that the sealing procedure may be carried out automatically. As a result, the throughput of composite fiber components to be sealed is considerably increased. Unreactive semifinished products that can be processed more effectively than, for example, epoxy adhesives, may be used as the sealing materials. In addition, the semifinished sealing products are not liquid, but are flexible solids that are easy to transport and handle.

Once sealed, no additional step of curing the composite fiber components is required, advantageously further increasing the throughput of components. In addition, the thermoplastic sealing material consolidates within a matter of seconds, and therefore both the sealing precision and speed noticeably increase. In addition, the quality of the edge seal can be reproduced considerably more effectively compared with the manual application of synthetic resin-based sealing materials, in particular with regard to an even material thickness and cut edge covering.

The solutions according to the disclosure herein for sealing the edges of composite fiber components are very advantageous particularly for both the automobile industry and aerospace sector, since the requirements for long-lasting and reliable edge seals will continue to rise in the future, especially in these fields of application, due to the increasing use of carbon fiber materials.

According to one embodiment of the method according to the disclosure herein, applying the thermoplastic semifinished product may comprise continuously feeding the thermoplastic semifinished product, in the form of a thermoplastic semifinished product strip, onto the cut edge of the composite fiber component. As a result, the process may be automated, for example by an industrial robot.

According to an additional embodiment of the method according to the disclosure herein, the thermoplastic semifinished product strip and the cut edge of the composite fiber component can have the same width.

According to an additional embodiment of the method according to the disclosure herein, the thermoplastic semifinished product may comprise a strip made of polyether ketone, polyether ether ketone, polyether ketone ketone, polyphenylene sulfide, polyetherimide, acrylonitrile butadiene styrene, polyarylene ether ketone or polysulfones.

According to an additional embodiment of the method according to the disclosure herein, the thermoplastic or integral joining may comprise ultrasonic welding using a rotating sonotrode. Particularly in continuous processes, a uniform welding process may be implemented, under controlled conditions, by a rotational sonotrode.

According to an embodiment of the sealing device according to the disclosure herein, the strip feeder may comprise a reel designed to continuously feed the thermoplastic semifinished product, in the form of a thermoplastic semifinished product strip, onto the cut edge of the composite fiber component.

According to an additional embodiment of the sealing device according to the disclosure herein, the thermoplastic semifinished product strip and the cut edge of the composite fiber component can have the same width.

According to an additional embodiment of the sealing device according to the disclosure herein, the thermoplastic semifinished product may comprise a strip made of polyether ketone, polyether ether ketone, polyether ketone ketone, polyphenylene sulfide, polyetherimide, acrylonitrile butadiene styrene, polyarylene ether ketone or polysulfones.

According to an additional embodiment of the sealing device according to the disclosure herein, the ultrasonic welding apparatus may comprise a rotating sonotrode.

BRIEF DESCRIPTION OF THE DRAWINGS

The disclosure herein will be described in more detail hereinafter in conjunction with and with reference to the embodiments as shown in the accompanying drawings by way of example.

The accompanying drawings provide better understanding of the present disclosure and illustrate variants of the disclosure herein by way of example. They serve to explain principles, advantages, technical effects and possible variations. Other embodiments and several of the intended advantages of the disclosure herein are of course likewise conceivable, in particular with reference to the detailed description of the disclosure herein given in the following. The elements in the drawings are not necessarily depicted in a manner true-to-scale and are sometimes depicted in either a simplified or schematic manner for reasons of clarity. The same reference signs denote the same or similar components or elements.

DETAILED DESCRIPTION

Although special embodiments are described and shown here, it is clear to a person skilled in the art that a considerable number of additional, alternative and/or equivalent implementations may be chosen for the embodiments, without significantly deviating from the basic principle of the present disclosure. In general, the disclosure herein is likewise intended to cover all variations of, and modifications and alterations to, the embodiments described herein.

Figure 1:
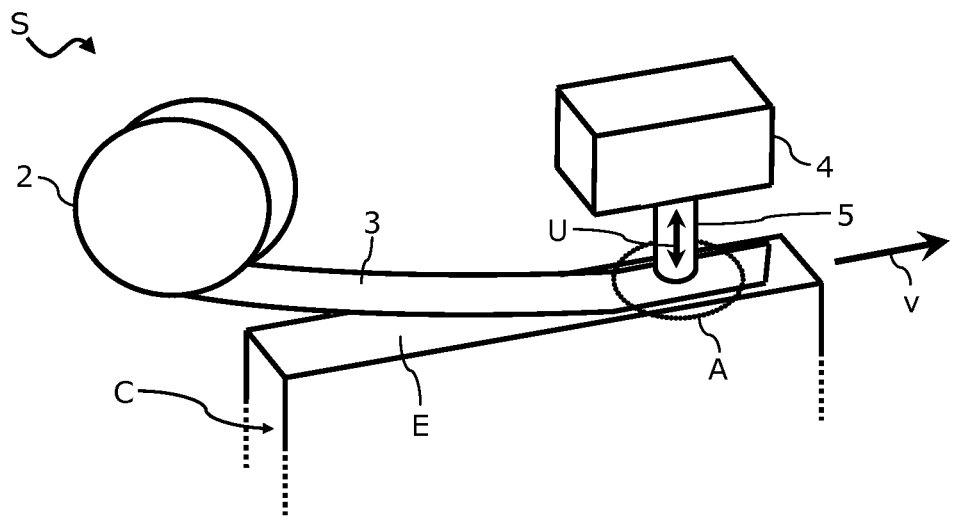
FIG. 1 is a schematic illustration of a sealing device according to one embodiment of the disclosure herein.

FIG. 1 is a schematic illustration of a sealing device S for sealing the edges of composite fiber components. A composite fiber component C, for example a carbon fiber-reinforced plastics component (CFRP) for use in the aerospace industry, can be fed to the sealing device S for this purpose. The composite fiber component C may for example be provided with a thermosetting matrix such as an epoxy resin or with a thermoplastic matrix made of polyether ketone, polyether ether ketone, polyether ketone ketone, polyphenylene sulfide or polyetherimide, for example.

The composite fiber component C comprises a cut edge E on which the fibers are exposed to the outside. The composite fiber component C is generally guided under an ultrasonic welding apparatus 4 in the direction of movement v so that the cut edge E passes under the active sonotrode 5 of the ultrasonic welding apparatus 4. It is also possible in this case to move the ultrasonic welding apparatus 4 over the fixed composite fiber component C.

Thermoplastic semifinished product, for example in the form of a thermoplastic semifinished product strip 3, is applied to the cut edge and introduced into the sealing device S between the sonotrode 5 and the cut edge E. The thermoplastic semifinished product strip 3 can, for example, be unrolled by a reel which is designed to continuously apply the thermoplastic semifinished product strip 3 to the cut edge E. The width of the thermoplastic semifinished product strip 3 may, for example, correspond to the width of the cut edge E of the composite fiber component C. Alternatively, it is also possible to select a larger width for the semifinished product strip 3 than the width of the cut edge E, and to envelope the side faces of the composite fiber component C following the welding step using the ultrasonic welding apparatus 4.

The semifinished product strip 3 may comprise a strip made of polyether ketone, polyether ether ketone, polyether ketone ketone, polyphenylene sulfide, polyetherimide, acrylonitrile butadiene styrene, polyarylene ether ketone or polysulfones for example. Such thermoplastics may be welded to a joining partner (composite fiber component C in this case) located therebeneath under the effect of heat and pressure, without the need for additional filler materials. In this case, the semifinished product strip 3 and the composite fiber component C are heated locally beyond their melting point and become fluid.

High-frequency alternating current is generated for an ultrasonic transducer ("converter") by a generator of the ultrasonic welding apparatus 4, which transducer generates mechanical movements in the ultrasonic frequency range in accordance with the high-frequency alternating current. The mechanical movements are transferred to a sonotrode 5 of the ultrasonic welding apparatus 4 by a booster, which sonotrode in turn transfers the ultrasonic vibrations U to the semifinished product strip 3 and the composite fiber component C.

The semifinished product strip 3 can be integrally joined to the cut edge E of the composite fiber component C by the ultrasonic vibrations U of the sonotrode 5 being introduced into the semifinished product strip 3 at a predetermined contact pressure. This causes friction between the molecules of the semifinished product strip 3 and the fiber composite component C and at the interface therebetween, and therefore the joining partners heat up and locally melt. The semifinished product strip 3 integrally bonds to the cut edge E of the composite fiber component C in the melting region A.

If the composite fiber component C is not mixed with a thermoplastic matrix, but for example with a thermosetting matrix, introducing ultrasonic vibrations U of the sonotrode 5 into the semifinished product strip 3 causes the semifinished product strip 3 to thermoplastically adhere or join to the cut edge E of the composite fiber component C. The thermoplastic join is based, in this case, on the melted semifinished product strip 3 adhering to the joining partner, i.e. the cut edge E of the composite fiber component C. This creates the advantage that no additional adhesive is needed for thermoplastic adhesion; melting the thermoplastic semifinished product strip 3 ensures that it can adhere to a non-thermoplastic material such as a composite fiber component C having a thermosetting matrix.

Different shapes can be used for the sonotrode 5, for example prismatic, cylindrical or catenoidal sonotrodes made of steel, aluminium or titanium for example. It can be advantageous in continuous ultrasonic welding processes to use a rotational sonotrode as the sonotrode 5 in order to continuously weld the semifinished product strip 3 to the cut edge E whilst simultaneously guiding the composite fiber component C through the sealing device S.

Figure 2:
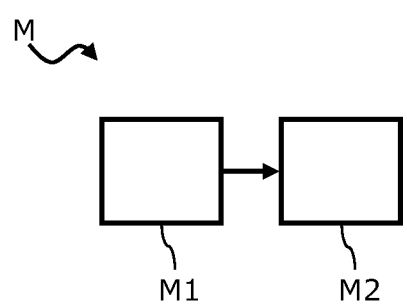
FIG. 2 is a block diagram of a method for sealing the edges of composite fiber components according to an additional embodiment of the disclosure herein.

FIG. 2 shows a block diagram for a method M for sealing the edges of composite fiber components, for example of carbon fiber-reinforced plastics components (CFRP). In order to implement the method M in FIG. 2, a sealing device may be used, for example a sealing device S as described in conjunction with FIG. 1.

In a first step M1, a thermoplastic semifinished product 3 is applied to a cut edge E of a composite fiber component C, for example by continuously feeding the thermoplastic semifinished product 3 in the form of a thermoplastic semifinished product strip. In this case, the width of the thermoplastic semifinished product strip 3 may correspond to the width of the cut edge E of the composite fiber component C. Polyether ketone, polyether ether ketone, polyether ketone ketone, polyphenylene sulfide, polyetherimide, acrylonitrile butadiene styrene, polyarylene ether ketone or polysulfone may for example be used as the material for the thermoplastic semifinished product 3.

In a subsequent step M2, the thermoplastic semifinished product 3 is integrally or thermoplastically joined to the cut edge E of the composite fiber component C by ultrasonic welding. This can, for example, be carried out by an ultrasonic welding process using a rotational sonotrode 5.

While at least one exemplary embodiment of the present disclosure(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for sealing edges of composite fiber-reinforced plastic components, the method comprising:
    applying a thermoplastic semifinished product, in a form of a thermoplastic semifinished product strip, to a cut edge of a composite fiber component, which is a carbon fiber-reinforced plastic component; and
    thermoplastically or integrally joining the thermoplastic semifinished product to the cut edge of the composite fiber component by ultrasonic welding,
    wherein the thermoplastic semifinished product strip and the cut edge of the composite fiber component have a same width.

2. The method according to claim 1, wherein applying the thermoplastic semifinished product comprises continuously feeding the thermoplastic semifinished product strip onto the cut edge of the composite fiber component.

3. The method according to claim 1, wherein the thermoplastic semifinished product strip comprises polyether ketone, polyether ether ketone, polyether ketone ketone, polyphenylene sulfide, polyetherimide, acrylonitrile butadiene styrene, polyarylene ether ketone, or polysulfones.

4. The method according to claim 1, wherein the thermoplastically or integrally joining comprises ultrasonic welding using a rotating sonotrode.

5. The method according to claim 1, wherein the thermoplastically or integrally joining comprises thermoplastically adhering the thermoplastic semifinished product strip to the cut edge of the composite fiber component.

* * * * *